United States Patent
Passarino

Patent Number: 5,643,655
Date of Patent: Jul. 1, 1997

[54] CONFORMABLE PAVEMENT MARKING TAPE

[75] Inventor: Sergio Passarino, Milan, Italy

[73] Assignee: Minnesota Mining and Manufacturing Company, St. Paul, Minn.

[21] Appl. No.: 350,718

[22] Filed: Dec. 7, 1994

Related U.S. Application Data

[63] Continuation of Ser. No. 56,420, May 3, 1993, abandoned.

[30] Foreign Application Priority Data

May 4, 1992 [IT] Italy ................................. MI92A1056

[51] Int. Cl.$^6$ ........................ B32B 5/16; E01F 9/04
[52] U.S. Cl. .................. 428/143; 428/141; 428/325; 428/517; 428/521; 404/10; 359/538
[58] Field of Search ..................... 428/141, 143, 428/355, 517, 521; 404/10, 14; 359/538

[56] References Cited

U.S. PATENT DOCUMENTS

| | | | |
|---|---|---|---|
| Re. 31,669 | 9/1984 | Eigenmann | 428/283 |
| 2,601,016 | 6/1952 | Hendricks et al. | 117/122 |
| 3,399,607 | 9/1968 | Eigenmann | 94/1.5 |
| 3,436,359 | 4/1969 | Hubin et al. | 260/2 |
| 3,782,843 | 1/1974 | Eigenmann | 404/9 |
| 3,935,365 | 1/1976 | Eigenmann | 428/323 |
| 4,020,211 | 4/1977 | Eigenmann | 428/323 |
| 4,117,192 | 9/1978 | Jorgensen | 428/337 |
| 4,146,635 | 3/1979 | Eigenmann | 428/283 |
| 4,166,083 | 8/1979 | Ueda et al. | 525/281 |
| 4,248,932 | 2/1981 | Tung et al. | 428/325 |
| 4,279,534 | 7/1981 | Eigenmann | 404/72 |
| 4,282,281 | 8/1981 | Exhen | 428/149 |
| 4,322,177 | 3/1982 | Eigenmann | 404/83 |
| 4,369,001 | 1/1983 | Eigenmann | 404/94 |
| 4,490,432 | 12/1984 | Jordan | 428/220 |
| 4,607,978 | 8/1986 | Eigenmann | 404/73 |
| 4,652,172 | 3/1987 | Eigenmann | 404/73 |
| 4,681,480 | 7/1987 | Eigenmann | 404/14 |
| 4,751,140 | 6/1988 | Ishihara | 428/324 |
| 4,876,141 | 10/1989 | Kobayashi et al. | 428/217 |
| 4,921,754 | 5/1990 | Ishihara | 428/325 |
| 4,968,764 | 11/1990 | Hayashida et al. | 526/283 |
| 4,983,678 | 1/1991 | Saito et al. | 525/193 |
| 4,990,024 | 2/1991 | Eigenmann | 404/12 |

FOREIGN PATENT DOCUMENTS

| | | |
|---|---|---|
| MI91A3213 | 6/1993 | Italy . |
| WO 93/11303 | 6/1993 | WIPO . |

OTHER PUBLICATIONS

*Encyclopedia of Polymer Science and Technology*, vol. 9, John Wiley & Sons, Inc., 1968, pp. 853–860.
Database WPI, Week 2493, Derwent Publications Ltd., London, GB; AN 93–1971411.

*Primary Examiner*—William Watkins
*Attorney, Agent, or Firm*—Gary L. Griswold; Walter N. Kirn; Robert H. Jordan

[57] ABSTRACT

A marking tape comprising a support base and a top layer, wherein said support base comprises a butadiene rubber, characterized in that said support base further comprises at least one resin selected from the group consisting of hydrogenated polycyclodienic resins and aliphatic hydrocarbon resins having a softening temperature of from 60° to 160° C.

23 Claims, 1 Drawing Sheet

CONFORMABLE PAVEMENT MARKING TAPE

This is a continuation of application Ser. No. 08/056,420 filed May 3, 1993.

FIELD OF THE INVENTION

This invention relates to road surface marking tapes for use on a roadway pavement so as to provide a traffic regulating line and/or other traffic information data thereon. More particularly this invention relates to a new and improved marking tape having improved conformability and physical properties, low temperature flexibility, and low environmental pollution.

BACKGROUND OF THE ART

The art of marking road surfaces is well trafficked and widely known. The marks, most commonly traffic lines, can be painted on the road surface, or formed thereon by applying liquid or molten material thereto, or provided thereon by applying and adhesively securing manufactured marking tapes. The formed or applied traffic lines or any other marks will thereafter form a part of the road surface and will be correspondingly subjected to the wear and destructive action of traffic. A continuing goal in the pavement-marking industry is to find economical products from which to form traffic control stripes having a longer useful life than the commonly used painted stripes.

One type of product comprises paints based on epoxy resins. These provide a longer life than some other paints, but nevertheless have achieved only a small usage, probably because some epoxy paints cure slowly, and elaborate and expensive application procedures may be required. Also, the applied lines frequently tend to spall and crack, show little impact resistance, and discolor with age.

Thicker coatings, such as thermoplastic polymers extruded or sprayed while in a liquid or molten condition, have produced some increase in life because of the greater amount of material to be worn away. However, the increased amount of material also increases the cost of the markings, and both expensive equipment and inconvenient procedures are required to apply them. Also, the high profile of these markings can be disturbing to passing traffic, and the lines are especially susceptible to removal by snowplow blades. Such markings will also tend to spall, especially when applied to concrete, apparently because of the mismatch of thermal expansion characteristics between the rigid thick markings and the concrete.

Roadmarks consisting of preformed tapes or strips are well known in the art to be advantageous in comparison to the conventional traffic aids described above. Preformed marking tapes are typically formed from a composite structure comprising a support base of calendared rubber compound, a self adhesive bottom layer, and a top-coat anti-wear layer incorporating anti-skid material and light retro-reflective elements. Such a composite structure is disclosed in many patents, such as U.S. Pat. Nos. 3,782,843, 3,935,365, 3,399,607, 4,020,211, 4,117,192, and 4,990,024.

However, this kind of marking tape still shows less than desired durability. Marking tapes comprising a support of unvulcanized elastomer and a top-coat of polyurethane having a high capacity to be deformed, high permanent set, and low elastic return are disclosed in the art as suitable materials to obtain a superior durability. These marking tapes deform readily into intimate contact with irregular pavement surfaces, absorb the energy of wheel impacts without fracture and avoid the stretch-return action that has been found to loosen marking tapes from a roadway pavement. Typical examples of such marking tapes can be found in U.S. Pat. Nos. 4,117,192 and 4,990,024. A negative aspect of such a deformable marking tape relates to its low mechanical properties, in particular a low tensile strength, a low 10% modulus and too high a level of elongation. The term "10% modulus", as used herein, means the load (expressed in kg/cm$^2$) to be applied to the marking tape to have a 10% elongation relative to its initial length.

U.S. Pat. No. Re. 31,669 discloses the use of a non-woven material interposed between a support and a polyurethane top-coat to obtain a stiffer, less deformable, and less temperature sensitive marking tape. However, such a construction tends to have a high elastic return which, under the action of traffic, promotes the detachment of the tape from the roadway.

Italian Patent Application No. MI 003213/91A discloses the use of a support base comprising a saturated acrylonitrile butadiene elastomer grafted with a zinc salt of (meth)acrylic acid to improve the mechanical characteristics.

Accordingly, in spite of much work in the field of preformed marking tape, there is still the need of an improved marking tape that shows a high permanent set with moderate elongation, high mechanical properties, and low temperature sensitivity. There is still the need for an improved marking tape that shows long durability under any weather and traffic conditions.

SUMMARY OF THE INVENTION

This invention relates to a marking tape comprising a support base and a top layer, wherein said support base comprises a butadiene rubber, wherein said support base further comprises at least one resin selected from the group consisting of hydrogenated polycyclodienic resins and aliphatic hydrocarbon resins having a softening temperature of from 60° to 160° C.

It has surprisingly been found that the presence of hydrogenated polycyclodienic resins or aliphatic hydrocarbon resins improves both the permanent set value of the support, so improving the conformability of the marking tape to the road surface, and its mechanical properties.

These figures, which are idealized, are not to scale and are intended to be merely illustrative and non-limiting.

DETAILED DESCRIPTION OF ILLUSTRATIVE EMBODIMENTS

Figure 1:
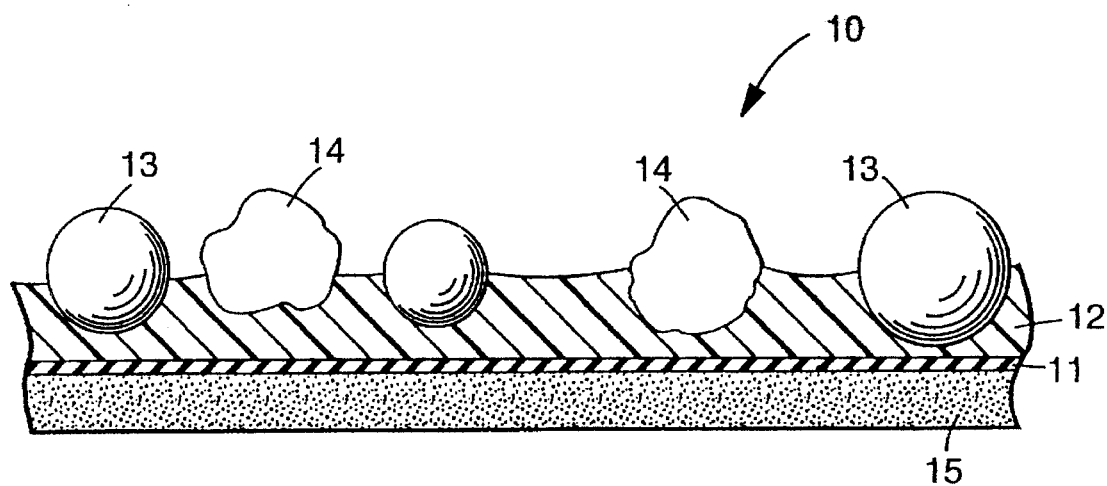
FIG. 1 shows in cross-section a preformed marking tape 10 comprising an adhesive layer 15 on a base layer 11 with a top layer 12. In layer 12 are transparent microspheres 13 and skid-resistant particles 14.

An example of preformed road marking tape of the present invention is illustrated in FIG. 1, wherein an enlarged partial section view of the tape is represented as 10. The marking tape comprises a support base 11, a top layer 12 adhered to one surface of the support base 11, and particulate material partially embedded in the layer 12 and partially exposed above the surface of the marking tape. In the illustrated embodiment the particulate material comprises transparent microspheres 13, which serve as retroreflective elements, as well as irregularly shaped skid-resisting particles 14. Adhesives are generally used to adhere the marking tape to a roadway, and a layer 15 of pressure-sensitive or other adhesive may be included in the marking tape of the present invention.

The support base 11 is usually a calendared tape of an unvulcanized rubber compound. Particularly useful materials are unvulcanized compounds based on acrylonitrile butadiene rubber (NBR), having good conformability and physical properties. Examples of such compounds are known with the trade name of BREON™, manufactured by Nippon Zeon Co., or PERBUNAN™ manufactured by Bayer. Other useful materials to be used in combination with the above NBR are, for example, styrene-butadiene rubber and highly saturated acrylonitrile rubber (HSN) grafted with zinc salt of (meth)acrylic acid, this latter as described in IT Patent Application No. MI 003213/A91. Commercially available examples of such compounds are, for example, EUROPRENE™ Sol T161 manufactured by Enichem and ZSC™ 2295 manufactured by Nippon Zeon Co. These additional materials can be used in a weight ratio of from 90:10 to 70:30, relative to the acrylonitrile butadiene rubber main component. The elastomer precursor ingredients preferably account for at least 50% by weight of the rubber composition.

The use of modifying agents to improve the mechanical and/or physical properties of natural or synthetic elastomer is known in the art. Previously known suitable modifying agents are, for example, chloroparaffines or hydrocarbon resins, as suggested, for example, in U.S. Pat. No. 4,117,192. The term "hydrocarbon resins" as used in the industry, refers to a group of high molecular weight substances, often of ill-defined composition, that principally comprises mixtures of unsaturated hydrocarbons derived from coal (in particular coumarone-indene resins) or petroleum, terpene resins, and condensation products of aromatic hydrocarbons with formaldehyde. This wide range of substances is used in a number of applications, particularly in the field of adhesives and rubbers, where they act as tackifiers and will improve stiffness, tensile properties, and tear and abrasion resistance. References can be found in the Encyclopedia of Polymer Science and Technology under the term "Hydrocarbon Resins". Some hydrocarbon resins, as defined above, such as, for example, coumarone-indene resins, terpene resins, aromatic hydrocarbon resins, and unsaturated aliphatic resins have been tested as modifier of road marking tape support base. Many of them show the disadvantages of a bad color maintenance (yellowing) or a low compatibility with the acrylonitrile butadiene rubber or a difficult workability, particularly at high loadings. In unvulcanized rubber composition for marking tape support, chloroparaffines are normally used as modifying agents, to improve and/or modify the mechanical and physical properties of the basic rubber composition in order to make it suitable for road marking tape. The use of such compounds improves both mechanical characteristics and conformability, but causes some problems of environment pollution, due to the presence of chlorine.

In an effort to replace such chloroparaffine derivatives various resins of different chemical composition have been tested, such as, for example, modified phenolic resins, polyamidic resins, melamine resins, polymethylmethacrylates, polycaprolactones, ethylvinylacetate resins, rosin esters, and the like. Some of these resins seemed to be very promising regarding the improvement in physical characteristics, but fail for other properties, such as, color maintenance, conformability, workability, or compatibility with the acrylonitrile butadiene rubber.

It has surprisingly been found that the use of a particular class of synthetic hydrocarbon resins in previously unknown combination with butadiene rubber provides a material showing excellent mechanical characteristics, without undesirably affecting permanent set and resistance to cracking while bonding at low temperature. Moreover, a marking tape essentially free of chlorine is obtained. The term "essentially free" means that no chlorinated paraffines are added to the support, and that the content of chlorine is lower than 0.1%, preferably lower than 0.01% by weight of the support base.

The hydrogenated polycyclodienic resins used in the present invention show a softening temperature of from 60° to 160° C., preferably of from 80° to 130° C., and a number average molecular weight of from 400 to 1000, preferably of from 450 to 800, more preferably of from 500 to 650. Softening point is measured according the ASTM E 28 method. Outside this range of molecular weight the resins tend to have a too low or too high value of softening point. A softening point lower than 60° C. tends to promote the wear of the support base, due to its excessive softening in particular when employed on road highly trafficked or exposed to high temperature (for example, during summer time). On the other hand a softening point higher than 160° C. causes problems of compatibility, especially with acrylonitrile butadiene rubber of the support base, with a difficult workability. Styrene butadiene rubbers tend to be more easily blended than acrylonitrile butadiene rubbers. These resins can be obtained by polymerization, and subsequent hydrogenation, of unsaturated cyclic monomers obtained from fractionation of the cracking products of petroleum derivatives. A wide range of unsaturated cyclic monomers can be obtained from petroleum derivatives, such as, for example, cyclopentene derivatives, cyclopentadiene derivatives, cyclohexene derivatives, cyclohexadiene derivatives, and the like. Examples of hydrogenated polycyclodienic resins useful in the present invention are known with the trade name of ESCOREZ™ 5120, ESCOREZ™ 5380, ESCOREZ™ 5300, ESCOREZ™ 5320, all manufactured by Exxon Chemicals.

The aliphatic hydrocarbon resins used in the present invention show a softening temperature of from 60° to 160° C., preferably of from 80° to 130° C., and a number average molecular weight of from 800 to 1600, preferably of from 900 to 1500, more preferably of from 1000 to 1400. Softening point is measured according the ASTM E 28 method. Outside this range of molecular weight the resins tend to have a too low or too high value of softening point. A softening point lower than 60° C. promotes the wear of the support, due to its excessive softening in particular when employed on road highly trafficked or exposed to high temperature (for example, during summer time). On the other hand a softening point higher than 160° C. causes problems of compatibility, especially with acrylonitrile butadiene rubber of the support base, with a difficult workability. These resins can be obtained by polymerization of unsaturated monomers obtained from fractionation of the cracking products of petroleum derivatives. A wide range of unsaturated monomers can be obtained from petroleum derivatives, such as, for example, ethylene derivatives, propylene derivatives, butadiene derivatives, isoprene derivatives, pentenes, hexanes, heptenes, and the like. Examples of aliphatic hydrocarbon resins useful in the present invention are known with the trade name of ESCOREZ™ 1304, ESCOREZ™ 1310, ESCOREZ™ 1315, all manufactured by Exxon Chemicals.

The hydrogenated polycyclodienic resins and the aliphatic hydrocarbon resins are used in combination with rubber in a rubber to resin weight ratio of from 10:1 to 10:6, preferably of from 10:2 to 10:5.

The use of the hydrogenated polycyclodienic resins or the aliphatic hydrocarbon resins of the present invention in combination with acrylonitrile butadiene rubber provides a support having a high tensile strength (at least 35 kg/cm$^2$, preferably at least 40 kg/cm$^2$), a good elongation at break (from 30% to 110%), a high yield modulus (more than 35 kg/cm$^2$, preferably more than 40 kg/cm$^2$) and a low yield elongation (lower than 50%, preferably lower than 30%), a very high conformability (permanent set higher than 60%, preferably higher than 70%) and glass transition temperature lower than −10° C., i.e., a good resistance to cracking while bending at low temperature.

As a result of the higher mechanical and conformability properties of the support of the present invention, it will be possible to reduce the conformance layer thickness, without affecting the field performance, but with evident cost reduction of the road marking tape. The use of a thinner support further means a road marking tape easier to deform into intimate contact with the road surface and reduced possibility to be removed by the traffic. The preferred thickness of the support 11 is of from 0.1 to 1 millimeter ("mm"), more preferably of from 0.3 to 0.7 mm.

In order to further improve the mechanical properties and the resistance to aging of the support base comprising the above described hydrogenated polycyclodienic and aliphatic hydrocarbon resins small amounts of ethylvinylacetate polymers (EVA) can be added in a resin to EVA ratio of from 2:1 to 10:1, preferably of from 3:1 to 7:1.

Alternatively the acrylonitrile butadiene rubber can be totally replaced by a styrene-butadiene rubber (SBR). The SBR typically exhibits a better compatibility with the resins of the present invention and allows attainment of a good resistance to aging without the need of the addition of the above described EVA polymers. Useful examples of styrene-butadiene rubbers are KRYLENE™ 1509, manufactured by Bayer AG, and EUROPRENE™ 1509, manufactured by Enichem S.p.A.

Support bases realized with styrene-butadiene rubber can be added with particular alkylene elastomers to further improve physical properties, in particular tensile strength. Examples of alkylene elastomers which can be useful in the present invention are ethylene-propylene copolymers, such as, for example, VISTAFLEX™ 911-214 manufactured by Exxon Co., ethylene-propylene-diene terpolymers, such as, for example, EPDM™ 227, manufactured by Bayer AG and DUNTRAL™ TER 4033 manufactured by Enichem S.p.A., and styrene-butadiene-styrene block copolymers, such as EUROPRENE™ SOL 161, manufactured by Enichem S.p.A., and CARIFLEX™ TR1101 manufactured by Shell Chemical Co. The elastomer can be added to the rubber in a rubber to elastomer weight ratio of from 1:1 to 5:1, preferably of from 2:1 to 4:1. The presence of such elastomers further improves the tear resistance of the road marking material, which is of particular importance for temporary tape application. A higher tear resistance reduces the risks of breaking during removal of the temporary tape.

Other additives such as mineral fillers and pigments can be added to the support base 11 if desired.

The top layer 12 comprises a composition including one or more polymeric binders possessing a high internal molecular cohesion. Examples of said polymeric binders are polyamide resins, polyvinyl derivatives, the polyester resins, such as polyethyleneterephthalates, and the polyurethane resins. Vinyl-based polymers (i.e., polymers that include at least 50% by weight of vinyl monomers) have been found particularly useful materials because of their toughness, abrasion resistance, and durability in a highway environment. Support films based on vinyl polymers are typically plasticized to provide desired flexibility. Useful flexibilizing polymers are, for example, acrylonitrile-butadiene polymers, and butadiene polymers. Polyurethane resins have been used for many years due to their high tensile and tear strength coupled with excellent abrasion resistance. The term polyurethane resin does not mean a polymer that only contains urethane groups, but as well understood in the art means all those polymers which contain significant numbers of urethane groups, regardless of what the rest of the molecule may be. Usually polyurethane compounds are obtained by the reaction of polyisocyanates with organic compounds which have at least two active hydrogen atoms, usually polyhydroxy compounds, such as polyethers, polyesters, castor oils, or glycols. Compounds containing groups such as amine and carboxyl may also be used. Thus a typical polyurethane compound may contain, in addition to urethane groups, aliphatic and aromatic hydrocarbon residues, ester groups, ether groups, amide groups, urea groups, and the like. The urethane group has the following characteristic structure:

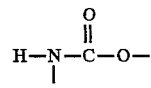

and polyurethane compounds have a significant number of these groups, although not necessarily repeating in a regular order. The most common method of forming polyurethane compounds is by the reaction of di- or polyfunctional hydroxy compounds, such as hydroxyl-terminated polyesters or polyethers, with di- or polyfunctional isocyanates. Examples of useful diisocyanates are represented by the following formula:

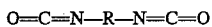

wherein R can be represented by substituted or unsubstituted alkylene, cycloalkylene, arylene, alkylene-bisarylene, arylenebisalkylene. Disocyanates within the formula above are, for example, 2,4-tolylene diisocyanate, 2,6-tolylene diisocyanate, 4,4'-diphenylmethane diisocyanate, dianisidine diisocyanate, toluidine diisocyanate, naphthylene diisocyanate, hexamethylene diisocyanate, m-xylydene diisocyanate, pyrene diisocyanate, isophorone diisocyanate, ethylene diisocyanate, propylene diisocyanate, octadecylene diisocyanate, methylene-bis(4-cyclohexyl isocyanate) and the like.

Examples of di- or polyfunctional hydroxy compounds are polyethers and polyesters having a molecular weight of from about 200 to 20,000, preferably of from about 300 to 10,000. Most of the polyethers used for the manufacture of polyurethanes are derived from polyols and/or poly (oxyalkylene) derivatives thereof. Examples of useful polyols include: 1) diols such as alkylene diols of 2 to 10 carbon atoms, arylene diols such as hydroquinones, and polyether diols [HO(RO)$_n$H] where R is alkylene, 2) triols such as glycerol, trimethylol propane, 1,2,6-hexanetriol, 3) tetraols such as pentaerythritol, 4) higher polyols such as sorbitol, mannitol, and the like. Examples of polyesters used for the manufacture of polyurethanes are saturated polyesters having terminal hydroxy groups, low acid number and water content, derived from adipic acid, phthalic anhydride, ethylene glycol, propylene glycol, 1,3-butylene glycol, 1,4-butylene glycol, diethylene glycol, 1,6-hexanediol, 1,2,6-hexanetriol, trimethylolpropane, trimethylolethane, neopentylglycol, and the like. Other desirable polyols include castor oil (a mixture Of esters of glycerol and fatty acids, the most relevant thereof is the ricinoleic acid), lactones having end hydroxyl groups (such as polycaprolactone), and block copolymers of propylene and/or ethylene oxide copolymerized with ethylenediamine.

Specific examples of polyurethane resins having good conformability and elongation and reduced elastic return useful in the road marking tape of the present invention can be found, for example, in U.S. Pat. No. 4,248,932 disclosing a conformable tape having a composition deriving from a conformable supporting layer and a flexible polyurethane top layer, in EP Patent No. 162,229 disclosing a method to realize a conformable polyurethane topcoat by introducing into the polymer some particular molecular structures, and in Italian Patent Application No. MI 003213/91A disclosing an improvement of the above mentioned EP Patent. Other polymers or resins may also be used in the top layer instead of or in addition to the above mentioned polymers. For example, epoxy resins as described in U.S. Pat. No. 4,248,932 or polyethylenediamines as described in U.S. Pat. No. 3,436,359. In a preferred aspect a top layer showing physical characteristics and conformability comparable to those of the support layer of the present invention is chosen.

Although the top layer in the road marking tape of the present invention can be formed by coating liquid mixture of ingredients directly on the support base, the layer may be formed separately and then bonded to the support base in a laminating operation, (e.g., by laminating directly together or laminating with an interposed adhesive layer between the top layer and the support base). The top layer has a thickness of from 0.025 to 0.15 mm, preferably of from 0.05 to 0.1 mm. The top layer can be coated directly on the support base or an intermediate thin layer comprising a highly tension resistant polymeric resin optionally impregnated with a synthetic rubber composition can be interposed between them, as disclosed, for example, in U.S. Pat. No. 4,146,635.

The retroreflective elements, usually glass microspheres, ceramic beads, or other durable, generally inorganic particulate material, are partially embedded in the top layer, typically in a scattered, or random manner. A scattered arrangement of light retroreflective elements provide the level of retroreflectivity typically expected in pavement markings, and is more skid-resistant than a densely packed layer. A monolayer of glass microspheres, ceramic beads and any other particulate additive can be partially embedded in the top layer during its formation, i.e., by cascading the retroreflective elements onto the carrier web after a mixture of the top layer ingredients has been coated on the carrier web and partially dried. In less preferred embodiments the retroreflective elements may be adhered to the top layer with a coating of adhesive or binder material.

The glass microspheres usually have an index of refraction of between about 1.5 and 2, and preferably have an index of at least 1.7 to provide good reflectivity under dry conditions. If the tape is predominantly used in wet conditions, some or all of the microspheres should have a refraction index of about 2.2 or higher. The size of the microspheres is usually in the range of from about 150 microns ("μm") to about 800 μm in diameter, and other particulate materials will generally have a similar order of size. References to methods and kinds of microsphere distribution can be found in U.S. Pat. Nos. 4,279,534, 4,322,177, 4,369,001, 4,607,978, 4,652,172, and 4,681,480.

Irregular or angular, inorganic skid-resisting particles such as ceramic, sand, quartz, corundum, beryllium, silicon carbide, or other abrasive particles will generally be included in the tape of the invention together with the microspheres and, for some particular use where no retroreflectivity is needed, skid resisting particles may be the only particles included. Preferably the anti-skid particles exhibit a hardness of at least 6°, on the Mohs' Hardness Scale, more preferably at least 7°. The number of the skid resisting elements in a given volume of top layer is determined, by simple experimentation, so that not more than 20% of the surface area is covered thereby, preferably not more than 10%. The density of such elements is a function of the physical characteristics of such elements (their hardness and sharpness is related to their ability to provide more or less grip on the vehicle tires) and of the average traffic on the roadway to be marked. The average dimension of each particle is in the range of from 0.1 to 1 mm, preferably from 0.5 to 0.8 mm, and more preferably about 0.7 mm. The tape material of the present invention can be defined as "anti-skid" when its adherence coefficient, with respect to current tired vehicles, averages the value of 400. This value is in terms of the angle to the horizontal at which a force corresponding to the weight applied to a loaded tired wheel is directed to cause skidding of said wheel along the surface being tested. Other references on anti-skid particles can be found in U.S. Pat. Nos. 3,935,365, 3,782,843, and 4,020,211.

The microspheres or other top layer partially embedded particles are preferably treated with a binder that improves adhesion between them and the top layer. Such a binder can be incorporated in the top layer if desired, where it contacts the microspheres or other particles when they are embedded in the layer. Alternatively particles may be treated with binder prior to introduction to the top layer material. The molecule of such a binder generally has an inorganic portion which associates with the microspheres or the particles, and an organic portion, which associates with and may react with organic ingredients of the top layer. Preferably the binder is selected from the group consisting of polyester resins, acrylic and methacrylic resins, polyvinyl butyrals, and, most advantageously epoxy resins. Inorganic binders can also be used, such as, for example, silicate binders added to a chlorinated rubber latex. Silane and titanate coupling agents are also useful.

Pigments or other coloring agents will be included in the top layer in an amount sufficient to color the tape for use as traffic line. Titanium dioxide will typically be used for obtaining a white color, whereas lead chromate will typically be used to provide a yellow color. Red and orange are also standard traffic-control colors, and other colors can be used for special-purpose markings. Heavy metal free colorants (e.g., lead chromate free pigments) can be used to enhance the environmentally beneficial attributes of marking tapes of the invention.

EXAMPLES

Some illustrative examples of component formulations will be described hereinbelow for assistance in understanding the invention.

Example 1

A set of five supports having a thickness of 0.5 mm and the composition of the following table 1 was prepared. Each quantity is expressed in parts by weight. Composition 1 is a comparison example, compositions 2 to 5 are examples of the invention.

TABLE 1

| Ingredients | 1 comp. | 2 inv. | 3 inv. | 4 inv. | 5 inv. |
|---|---|---|---|---|---|
| Breon ™ 3325 | 80 | 80 | 80 | 80 | 80 |
| Breon ™ 3380 | 20 | 20 | 20 | 0 | 0 |
| Europrene ™ SOL 161 | 0 | 0 | 0 | 20 | 0 |
| ZSC ™ 2295 | 0 | 0 | 0 | 0 | 20 |
| Chloparin ™ 70 | 65 | 0 | 0 | 0 | 0 |
| Chloparin ™ 68 | 10 | 0 | 0 | 0 | 0 |
| Escorez ™ 5300 | 0 | 30 | 0 | 0 | 0 |
| Escorez ™ 1310 | 0 | 0 | 30 | 30 | 30 |
| Vulcasil S ™ VN3 | 70 | 70 | 70 | 40 | 40 |
| Mistron Superfrost ™ | 100 | 100 | 100 | 100 | 100 |
| Titanium Dioxide | 120 | 120 | 120 | 120 | 120 |
| Santowhite ™ Powder | 1.5 | 1.5 | 1.5 | 1.5 | 1.5 |
| Santovar ™ A | 1 | 1 | 1 | 1 | 1 |
| Stearic Acid | 2 | 2 | 2 | 2 | 2 |
| Dynapol ™ 206 | 5 | 5 | 5 | 5 | 5 |

BREON™ 3325 is the trade name of an acrylonitrile-butadiene rubber produced by Nippon Zeon Co., BREON™ 3380 is the trade name of an acrylonitrile-butadiene rubber produced by Nippon Zeon Co., ZSC™ 2295 is the trade name of a highly saturated acrylonitrile-butadiene rubber grafted with zinc salt of methacrylic acid produced by Nippon Zeon Co., EUROPRENE™ SOL T161 is the trade name of a styrenebutadiene rubber produced by Enichem, CHLOPARIN™ 70 and 68 are the trade names of two chloroparaffines containing respectively 70 and 65 weight % of Cl produced by Hoechst Caffaro S.p.A., ESCOREZ™ 1310 is the trade name of an aliphatic hydrocarbon resin produced by Exxon Chemicals, ESCOREZ™ 5300 is the trade name of a hydrogenated polycyclodienic resin produced by Exxon Chemicals, VULCASIL™ is the trade name of an amorphous silica produced by Bayer, MISTRON SUPERFROST™ is the trade name of a mixture of talc (95%) and chlorite (5%) produced by Cyprus Industrial Mineral, SANTOWHITE™ POWDER is the trade name of a dialkyl phenol antioxidant produced by Monsanto, SANTOVAR™ A is the trade name of an alkylated polyhydroxy phenol antioxidant produced by Monsanto, DYNAPOL™ 206 is the trade name of a polyester resin produced by Huls.

In the following Table 2 are summarized the mechanical properties of the rubber based supports obtained from the recipes of Table 1. Yield and elongation tests were performed at about 22° C. at an elongation rate of about 10 centimeters/minute.

TABLE 2

| Properties | | 1 | 2 | 3 | 4 | 5 |
|---|---|---|---|---|---|---|
| Yield elongation | % | 60 | 15 | 20 | 25 | 12 |
| Yield modulus | kg/cm² | 18 | 42 | 44 | 50 | 55 |
| Tensile strength | kg/cm² | 30 | 42 | 44 | 75 | 60 |
| Elongation at break | % | 290 | 85 | 80 | 110 | 75 |
| Compression set | % | 50 | 80 | 85 | 65 | 70 |
| Permanent set 40% | % | 45 | 80 | 80 | 60 | 70 |
| Break permanent set | % | 50 | 76 | 80 | — | — |
| Resistance to 3 bendings of 360° | at 0° C. | no | yes | yes | yes | yes |
| | at −10° C. | no | yes | yes | yes | yes |

The term yield modulus means the load to be applied to the support base to reach the yielding point. The value of permanent set 40% is measured according the following formula:

$$\text{Permanent set } 40\% = \frac{L_e - L_i}{L - L_i} * 100$$

wherein $L_i$ is the initial length of the specimen, L is the length of the specimen after an elongation of 40% and $L_e$ is the length of the specimen measured five minutes after the end of the elongation. The value of break permanent set is measured according the following formula:

$$\text{Permanent set at break} = \frac{L_e - L_i}{L - L_i} * 100$$

wherein $L_i$ is the initial length of the specimen, L is the length of the specimen immediately after break, and $L_e$ is the length of the specimen measured five minutes after the break.

The bending test comprises the following steps: (1) to provide two samples having the same composition, (2) to perform a first set of three bendings at 0° C. on the first sample, and (3) to perform a second set of three bendings at −10° C. on the second sample. The bendings are performed by bending a sample (12.5 centimeters long by 2.5 centimeters wide) around a mandrel so that the ends of the sample touch (i.e., a 180° bend) and then straightening the sample for each bending. A good performance consists in the absence of either breaks or cracks on both the first and second sample.

Figure 2:
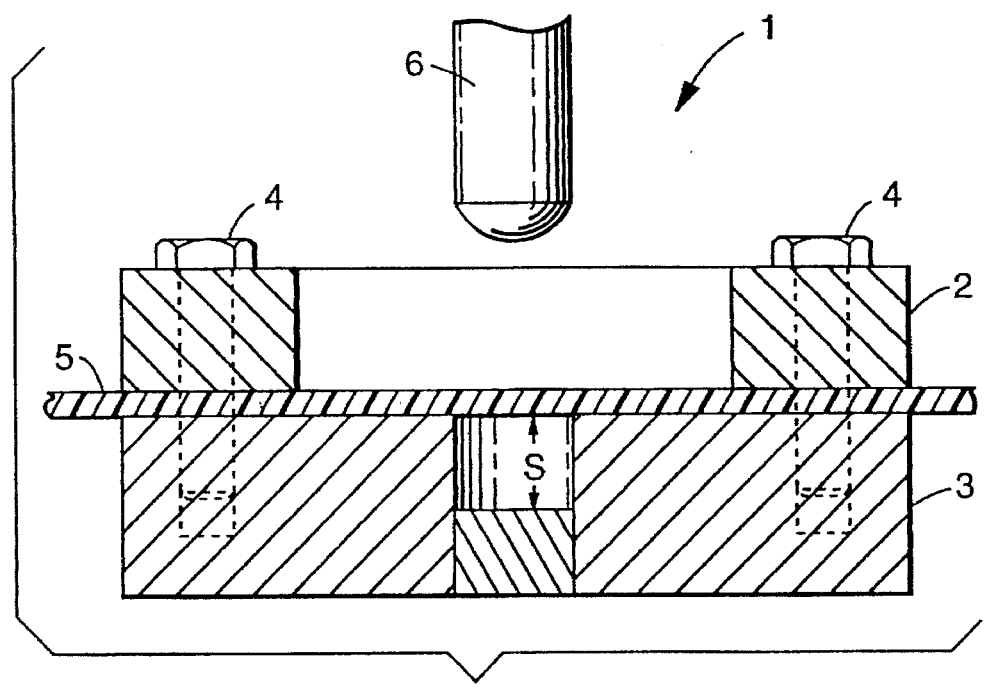
FIG. 2 shows in cross-section an apparatus for the compression test comprising a specimen holder 1, which consists of a clamp made of two metal plates 2 and 3, held together by four threaded bolts 4, to hold the specimen 5, and an indentor 6 connected to a force gauge (not shown).

The term compression set means the percentage of permanent deformation after a compression test. Compression test is performed by the apparatus of FIG. 2. The specimen holder 1 consists of a clamp made of two metal plates 2 and 3, held together by four threaded bolts 4, to hold the specimen 5 flat and free from slight movements. The plate 3 is provided with a blind hole having a depth S. The indentor 6 consists of a vertical shaft attached at the upper end to the force gauge (not shown), and having at the lower end a rounded steel end 0.5 inch (1.27 cm) in diameter. The measurement consists of measuring the depth of permanent deformation after 1 minute of recovery from the end of a deformation with a fixed force (e.g., 30 pounds) or to a fixed depth (e.g., 0.5 inch).

The data of table 2 clearly show the improvement of the present invention. In particular the high values of permanent set and compression set allow to obtain a road marking tape having a high stability of conformability to the roadway surface. This means a better adhesion to the road surface and a lower tendency to detachment. On the other hand a high value of yield modulus and tensile strength, and a low value of yield elongation render the road marking tape more resistant to the wear and destructive action of traffic. The resistance to bending at temperature below 0° C. allows the use in a wider application range.

Example 2

A set of five supports having a thickness of 0.5 mm and the composition of the following table 3 were prepared. Each quantity is expressed in parts by weight.

TABLE 3

| Ingredients | 6 | 7 | 8 | 9 | 10 |
|---|---|---|---|---|---|
| Breon ™ 3325 | 80 | 80 | 80 | 80 | 80 |
| Breon ™ 3380 | 20 | 20 | 20 | 20 | 20 |
| Elvax ™ 410 | 30 | 0 | 0 | 0 | 0 |
| Elvacite ™ 2041 | 0 | 30 | 0 | 0 | 0 |
| Cellabond ™ J1005H | 0 | 0 | 15 | 0 | 0 |
| Capa ™ 600P | 0 | 0 | 0 | 30 | 0 |
| Versamid ™ 940 | 0 | 0 | 0 | 0 | 30 |
| Vulcasil S ™ VN3 | 70 | 70 | 70 | 70 | 70 |
| Mistron Superfrost ™ | 100 | 100 | 100 | 100 | 100 |
| Titanium Dioxide | 120 | 120 | 120 | 120 | 120 |
| Santowhite ™ Powder | 1.5 | 1.5 | 1.5 | 1.5 | 1.5 |
| Santovar ™ A | 1 | 1 | 1 | 1 | 1 |
| Stearic Acid | 2 | 2 | 2 | 2 | 2 |
| Dynapol ™ 206 | 5 | 5 | 5 | 5 | 5 |

ELVAX™ 410 is the trade name of an ethylene-vinylacetate resin produced by DuPont, ELVACITE™ is the trade name of a methylmethacrylate resin produced by DuPont, CELLOBOND™ J1005H is the trade name of a modified phenolic resin produced by BP Chemical, CAPA™ 6001 is the trade name of a polycaprolactone resin produced by Interox Chemical Ltd., VERSAMID™ is the trade name of a polyamide resin produced by Schering AG.

In the following Table 4 are summarized the mechanical properties of the rubber based supports obtained from the recipes of Table 3.

TABLE 4

| Properties | | 6 | 7 | 8 | 9 | 10 |
|---|---|---|---|---|---|---|
| Yield elongation | % | 35 | — | 65 | 40 | 40 |
| Yield modulus | kg/cm$^2$ | 35 | — | 90 | 28 | 40 |
| Tensile strength | kg/cm$^2$ | 40 | — | 92 | 35 | 50 |
| Elongation at break | % | 140 | — | 75 | 200 | 140 |
| Compression set | % | 50 | — | 60 | 45 | 45 |
| Permanent set 40% | % | 50 | — | 65 | 45 | 50 |
| Color maintenance | | yes | — | no | yes | yes |
| Resistance to 3 bendings at 0° C. | | yes | | yes | yes | yes |

In comparing the data of table 4 with the data of table 2 it is clearly shown the improvement of the present invention relative to the addition of other known resins. The data of sample 7 are not shown because the addition of ELVACITE™ 2041 has a limited compatibility with the present rubber composition. The addition of CELLOBOND™ J1005H in sample 8 promotes a strong yellowing of the support with the formation of a dark color. A sample equal to sample 8 but with 30 parts by weight of CELLOBOND™ J1005H shows a further disadvantage of high stiffness and low resistance to bending. Samples 6, 9, and 10 show lower conformability and mechanical properties.

Example 3

A support having a thickness of 0.5 mm and the composition of the following Table 5 was prepared. Each quantity is expressed in parts by weight.

TABLE 5

| KRYLENE ™ | 75 |
|---|---|
| EPDM ™ 227 | 25 |
| ESCOREZ ™ 5300 | 30 |
| VULCASIL S ™ VN3 | 70 |
| MISTRON SUPERFROST ™ | 170 |
| Titanium Dioxide | 30 |
| YELLOW 83 ™ | 5 |
| Stearic Acid | 2 |
| ANOX T ™ | 1.5 |

KRYLENE™ 1509 is the trade name of a styrene-butadiene rubber manufactured by Bayer, EPDM™ 227 is the trade name of an ethylene-propylene-diene terpolymer manufactured by Bayer, Yellow 83™ is the trade name of a yellow pigment manufactured by Hoechst, ANOX T™ is the trade name of a phenol modified antioxidant manufactured by Bozzetto S.p.A. (IT).

In the following Table 6 are summarized the mechanical properties of the rubber based support obtained from the recipe of Table 5. The aging has been obtained keeping the sample oven at 78° C. for 15 days before evaluation.

TABLE 6

| | | Fresh | After Aging |
|---|---|---|---|
| Yield modulus | kg/cm$^2$ | 43 | 45 |
| Tensile strength | kg/cm$^2$ | 43 | 45 |
| Elongation at break | % | 140 | 130 |
| Permanent set 40% | % | 90 | 85 |
| Break permanent set | % | 95 | 90 |
| Resistance to 3 bendings of 180° | at 0° C. | yes | yes |
| | at −10° C. | yes | yes |

The data of Table 6 show a further improvement of the permanent set values of SBR based support. This means a further improvement in the stability of conformability to the roadway surface, i.e., a better adhesion to the road surface and a lower tendency to detachment.

What is claimed is:

1. A marking tape comprising a support base and a top layer, wherein said support base comprises butadiene copolymer rubber, characterized in that said support base further comprises at least one modifying agent selected from the group consisting of hydrogenated polycyclodienic resins having a number average molecular weight of from 400 to 1000 and a softening temperature of from 60° to 160° C. and aliphatic hydrocarbon resins having a number average molecular weight of from 800 to 1600 and a softening temperature of from 60° to 160° C.

2. The marking tape according to claim 1 characterized in that said modifying agent has a softening temperature of from 80° to 130° C.

3. The marking tape according to claim 1 characterized in that said hydrogenated polycyclodienic resin has a softening temperature of from 80° to 130° C. and a number average molecular weight of from 450 to 800.

4. The marking tape according to claim 1 characterized in that said aliphatic hydrocarbon resin has a softening temperature of from 80° to 130° C. and a number average molecular weight of from 900 to 1500.

5. The marking tape according to claim 1 characterized in that said support base is essentially free of chlorine.

6. The marking tape according to claim 1 characterized in that said butadiene copolymer rubber comprises a blend of acrylonitrile butadiene rubber and styrene-butadiene rubber in a weight ratio of from 90:10 to 70:30.

7. The marking tape of claim 6 characterized in that said support base further comprises an ethylene vinyl acetate polymer in a modifying agent to ethylene vinyl acetate weight ratio of from 2:1 to 10:1.

8. The marking tape according to claim 1 characterized in that said butadiene copolymer rubber comprises a styrene butadiene rubber.

9. The marking tape of claim 8 characterized in that said support base further comprises a polyalkylene elastomer in a rubber to elastomer weight ratio of from 1:1 to 5:1.

10. The marking tape according to claim 1 characterized in that said modifying agent is used in a rubber to modifying agent weight ratio of from 10:1 to 10:6.

11. The marking tape according to claim 1 characterized in that said support base shows a tensile strength of at least 35 kg/cm$^2$ and an elongation at break of from 30% to 110%.

12. The marking tape according to claim 1 characterized in that said support base shows a yield modulus higher than 35 kg/cm$^2$ and a yield elongation lower than 50%.

13. The marking tape according to claim 1 characterized in that said support base shows a permanent set higher than 60%.

14. The marking tape according to claim 1 characterized in that said support base shows a glass transition temperature lower than −10° C.

15. The marking tape according to claim 1 characterized in that said support base has a thickness of from 0.3 to 0.7 mm.

16. The marking tape according to claim 1 characterized in that said top layer comprises particles partially embedded therein.

17. The marking tape according to claim 16 characterized in that at least some of said particles are retroreflective particles.

18. The marking tape according to claim 16 characterized in that at least some of said particles comprise anti-skid particles.

19. The marking tape according to claim 1 wherein said modifying agent is miscible with said butadiene copolymer rubber.

20. The marking tape according to claim 1 comprising as a modifying agent an aliphatic hydrocarbon resin having a number average molecular weight of from 800 to 1600 and a softening temperature of from 60° to 160° C.

21. The marking tape according to claim 1 comprising as a modifying agent a hydrogenated polycyclodienic resin having a number average molecular weight of from 400 to 1000 and a softening temperature of from 60° to 160° C.

22. The marking tape according to claim 1 characterized in that said support base shows a tensile strength of at least 35 kg/cm$^2$, an elongation at break of from 30% to 110%, a yield modulus higher than 35 kg/cm$^2$, a yield elongation lower than 50%, and a permanent set higher than 60%.

23. The marking tape of claim 1 characterized in that said support base has a tensile strength of at least 35 kilograms/centimeter$^2$, a yield modulus of at least 35 kilograms/centimeter$^2$, and a yield elongation of less than 50 percent.

* * * * *